United States Patent
Ichihashi

(10) Patent No.: US 6,914,653 B2
(45) Date of Patent: Jul. 5, 2005

(54) WAVELENGTH-SELECTIVE REFLECTION FILM COMPRISING LIQUID CRYSTAL MOLECULES ALIGNED IN CHIRAL SMECTIC PHASE

(75) Inventor: Mitsuyoshi Ichihashi, Kanagawa (JP)

(73) Assignee: Fuji Photo Film Co., Ltd., Minami-ashigara (JP)

( * ) Notice: Subject to any disclaimer, the term of this patent is extended or adjusted under 35 U.S.C. 154(b) by 56 days.

(21) Appl. No.: 10/442,111

(22) Filed: May 21, 2003

(65) Prior Publication Data

US 2003/0218708 A1 Nov. 27, 2003

(30) Foreign Application Priority Data

May 21, 2002 (JP) ........................................ 2002-145804
Jun. 13, 2002 (JP) ........................................ 2002-172498

(51) Int. Cl.⁷ ............................................. G02F 1/133
(52) U.S. Cl. ........................................................ 349/115
(58) Field of Search ................................. 349/176, 105, 349/115, 98, 172, 194

(56) References Cited

U.S. PATENT DOCUMENTS

| 5,288,426 A | * | 2/1994 | Itoh et al. ................. 252/299.5 |
| 6,537,624 B1 | * | 3/2003 | Suzuki et al. ................. 428/1.3 |
| 6,627,270 B1 | * | 9/2003 | Nishimura ................... 428/1.3 |
| 6,677,042 B2 | * | 1/2004 | Kuntz et al. ................. 428/402 |
| 6,778,237 B2 | * | 8/2004 | Arakawa et al. ............ 349/100 |
| 2001/0017676 A1 | * | 8/2001 | Arakawa et al. ............ 349/100 |
| 2002/0017633 A1 | * | 2/2002 | Goulding et al. ......... 252/299.5 |

FOREIGN PATENT DOCUMENTS

JP 2000-221493 A 8/2000

* cited by examiner

*Primary Examiner*—Kenneth Parker
(74) *Attorney, Agent, or Firm*—Burns, Doane, Swecker & Mathis, L.L.P.

(57) ABSTRACT

A wavelength-selective reflection film comprises at least one layer. In the layer, liquid crystal molecules are aligned in a chiral smectic phase. The chiral smectic phase has a helical pitch and an average refractive index. The product of the helical pitch and the average refractive index is in the range of 213 to 450 nm. The layer selectively reflects light in a particular wavelength range, and selectively transmits light in another wavelength range.

17 Claims, 2 Drawing Sheets

WAVELENGTH-SELECTIVE REFLECTION FILM COMPRISING LIQUID CRYSTAL MOLECULES ALIGNED IN CHIRAL SMECTIC PHASE

FIELD OF THE INVENTION

The present invention relates to a wavelength-selective reflection film, which can be used as an optical film, an optical collimator or a polarization-converting film. The wavelength-selective reflection film can also be used for improving a viewing angle of a liquid crystal display.

BACKGROUND OF THE INVENTION

Normal light, such as natural light (e.g., sunlight) or light emitted from general light-sources (e.g., an electric lamp) is white light, which has an essentially uniform spectral distribution.

On the other hand, optical materials or optical devices such as an optical film, an optical collimator, a polarization-converting film or a liquid crystal display usually use light in a particular wavelength range. Accordingly, the optical materials or optical devices use the normal light with poor efficiency.

A wavelength-selective reflection film has been proposed to improve the efficiency. The wavelength-selective reflection film selectively reflects light in a particular wavelength range, and selectively transmits light in another wavelength range. The optical materials or optical devices can use the reflected (or transmitted) light in the particular wavelength range. The transmitted (or reflected) light in another wavelength range, which has not been used in the optical materials or optical devices, can be used in another materials or devices, or can be converted into usable light.

Liquid crystal molecules in a cholesteric phase (Ch or N*) have been proposed to prepare the wavelength-selective reflection film. Japanese Patent Provisional Publication Nos. 9(1997)-304770, 10(1998)-54909, 11(1999)-44816, and International Patent Nos. WO97/16762, WO00/34808 disclose the wavelength-selective reflection film made of liquid crystal molecules in the cholesteric phase.

The wavelength-selective reflection film shows optical characters attributed to the cholesteric phase of the liquid crystal molecules.

First, the film totally reflects counterclockwise circularly polarized light and transmits clockwise-polarized light where the liquid crystal molecules are counterclockwise helically aligned in the cholesteric phase. The film totally reflects the clockwise circularly polarized light and transmits the counterclockwise-polarized light where the liquid crystal molecules are clockwise aligned.

Second, the film selectively reflects light in a wavelength range, which is independent from an incident angle of light.

Third, the film reflects a clockwise circularly polarized incident light as a clockwise circularly polarized reflected light, and reflects a counterclockwise circularly polarized incident light as a counterclockwise circularly polarized reflected light.

SUMMERY OF THE INVENTION

It is an object of the present invention to provide a wavelength-selective reflection film that totally reflects circularly polarized light in a particular wavelength range, regardless of whether light is circularly polarized clockwise or counterclockwise.

It is another object of the invention to provide a wavelength-selective reflection film that selectively reflects light in a wavelength range depending on an incident angle of light.

It is a further object of the invention to provide a wavelength-selective reflection film that reflects a clockwise circularly polarized incident light as a counterclockwise circularly polarized reflected light, and reflects counterclockwise circularly polarized incident light as a clockwise circularly polarized reflected light.

The present invention provides a wavelength-selective reflection film comprising at least one layer in which liquid crystal molecules are aligned in a chiral smectic phase (Sm*) having a helical pitch and an average refractive index, wherein the product (Pn) of the helical pitch (P) and the average refractive index (n) is in the range of 213 to 450 nm, and wherein the layer selectively reflects light in a particular wavelength range, and selectively transmits light in another wavelength range.

The product (Pn) of the helical pitch (P) and the average refractive index (n) is preferably in the range of 230 to 400 nm, and more preferably in the range of 250 to 380 nm.

The chiral smectic phase (Sm*) preferably has an axis of helix that is oriented at an angle of less than 45° (preferably less than 20°, and more preferably less than 10°) to a normal of the film plane.

The chiral smectic phase (Sm*) also preferably has an axis of helix that is oriented at an angle of 5 to 60° (preferably 10 to 55°, and more preferably 20 to 50°) to a major axis of the liquid crystal molecules.

The liquid crystal molecules are preferably rod like liquid crystal molecules, each of which more preferably has a polymerizable group as a substituent group bound to an end of the rod-like liquid crystal molecule.

The liquid crystal molecules are preferably polymerized to fix the chiral smectic phase (Sm*).

The chiral smectic phase (Sm*) preferably is a chiral smectic C phase (Sc* or SmC*).

The helical pitch (P) can continuously change along the direction of the thickness of the layer.

The wavelength-selective reflection film can be used in a broadband wavelength-selective reflection film, which comprises two or more wavelength-selective reflection films defined above, wherein the films are different in the helical pitch.

The broadband wavelength-selective reflection film can be advantageously used as an optical collimator.

The wavelength-selective reflection film can also be used in a liquid crystal display comprising a backlight, the wavelength-selective reflection film defined above, a linearly polarizing film and a liquid crystal cell in this order.

The wavelength-selective reflection film can further be used in a liquid crystal display comprising a backlight, the broadband wavelength-selective reflection film defined above, a linearly polarizing film and a liquid crystal cell in this order.

The applicant has studied a wavelength-selective reflection film, and found that liquid crystal molecules in a chiral smectic phase (Sm*) instead of a conventional cholesteric phase (Ch or N*) are used in a full pitch band to obtain new optical characters.

First, the above-mentioned film totally reflects circularly polarized light in a particular wavelength range, regardless of whether the light is polarized clockwise or counterclockwise. Accordingly, the film completely reflects the whole natural light in the particular wavelength range while a conventional wavelength-selective reflection film, which comprises liquid crystal molecules in a cholesteric phase, reflects half of the natural light.

Second, the film reflects light in a wavelength range depending on an incident angle of the light. The film can transmit almost 100% of perpendicularly incident light where an axis of helix in the chiral smectic phase is almost parallel to the normal of the film plane. As the incident angle (between incident plane and the normal of the film plane at point of incidence) increases, the reflection of the obliquely incident light increases. Further, the selected wavelength range shifts to the shorter region, as the incident angle increases. Accordingly, a collimation function (function of controlling the traveling direction of light) can be obtained where a helical pitch continuously changes along a direction of the thickness. The collimation function can also be obtained by laminating two or more wavelength-selective reflection films that are different in the helical pitch. The reflected light can be reused, since the collimation function is not accompanied by absorption of light.

Third, the film defined above can reflect a clockwise circularly polarized incident light as a counterclockwise circularly polarized reflected light, and reflect counterclockwise circularly polarized incident light as a clockwise circularly polarized reflected light. The film defined above reflects a circularly polarized light like a normal mirror does. However, the film defined above differs from a normal mirror about linearly polarized light. The film reflects the linearly polarized light so that the reflected light has a plane of polarization rotating by 90° based on the plane of polarization of the incident light.

DETAILED DESCRIPTION OF THE INVENTION

[Chiral Smectic Phase]

Figure 1:
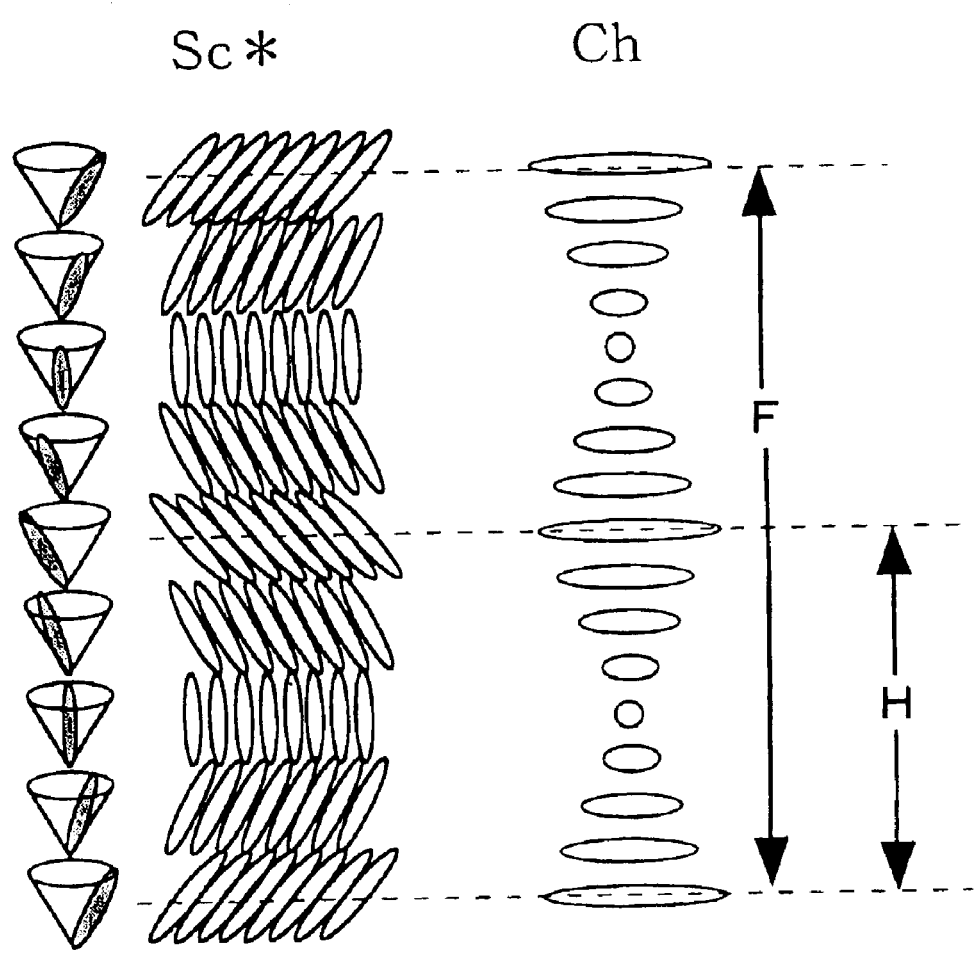
FIG. 1 schematically illustrates a full pitch band (F) and a half pitch band (H) in a chiral smectic phase (Sc*) and in a cholesteric phase (Ch).

In the present invention, liquid crystal molecules aligned in a chiral smectic (Sm*) phase are used in a full pitch band.

The term "chiral smectic phase" in the present specification means a smectic phase having a helical structure. Liquid crystal molecules should not have an optically active side to form the helical structure. The liquid crystal molecules can have chirality attributed to arrangement of atoms around the molecular axes. Further, liquid crystal molecules of banana type (which have no molecular chirality, but can induce a helical structure) can form the helical structure. The helical structures without optically active sites are described in J. Mat. Chem., vol. 7, pp. 1307(1997).

The chiral smectic phase (Sm*) preferably is a chiral smectic C phase (Sc* or SmC*), a chiral smectic I phase (Si* or SmI*) or a chiral smectic F phase (Sf* or SmF*), and more preferably is a chiral smectic C phase (Sc* or SmC*).

The chiral smectic C phase has been studied, and practically used as a phase of ferroelectric liquid crystal (FLC).

As described above, an optically active site is not essential for a helical structure of the chiral smectic phase. However, an optically active site can be introduced into the liquid crystal molecule, or a compound having an optically active site (i.e., a chiral agent) can be used in combination with the liquid crystal molecules. It depends on the chirality of the optically active site whether the chiral smectic phase has a clockwise or counterclockwise helical structure.

The liquid crystal molecules in a chiral smectic phase and the chiral agents are described in "FLC Display and Materials (Japanese)", A. Fukuda, CMC Publication Co., Ltd. (1992) and "Liquid Crystal Handbook (Japanese)", Maruzen (2000).

The liquid crystal molecules for a chiral smectic phase generally have rod-like molecular structures.

The liquid crystal molecules for a chiral smectic phase preferably have a high specific birefringence (An) to obtain required optical characters even if the layer is relatively thin.

The rod-like liquid crystal molecule having a high specific birefringence preferably is a bistolan compound, a phenylpyrimidine compound, a phenyl ester compound, and a biphenyl ester compound, and more preferably is a bistolan compound or a phenylpyrimidine compound. Two or more compounds can be used in combination.

The rod-like liquid crystal molecule can have a polymerizable group, with which the molecules can be polymerized to fix the chiral smectic phase. A liquid crystal polymer can be obtained by polymerization of rod-like liquid crystal molecules having polymerizable groups.

The polymerizable group is a functional group that causes polymerization reaction when the compound is irradiated with light (ultraviolet rays, visible rays) or electron beams, or is heated.

Examples of the polymerizable groups include an ethylenically unsaturated group, ethynyl, aziridynyl, epoxy, isocyanate, thioisocyanate, amino, hydroxyl, mercapto, carboxyl, an acyl group (including formyl), an acyl halide group and sulfo. An ethylenically unsaturated group, ethynyl, aziridynyl and epoxy are preferred. An ethylenically unsaturated group is particularly preferred.

The polymerizable group preferably is a substituent group bound to an end of the rod-like liquid crystal molecule. The liquid crystal molecule can have two or more polymerizable groups. Two polymerizable groups are preferably bound to both ends of the rod-like liquid crystal molecule.

Examples of the liquid crystal molecules are shown below. The molecules (1) to (17) are achiral, and are used in combination with a chiral agent. The molecules (18) and (19) are chiral, and can form the chiral smectic phase without use of a chiral agent. The molecules (14) to (18) have polymerizable groups (ethylenically unsaturated groups), and can be polymerized to fix the chiral smectic phase. Further, the molecules (14) to (18) can be polymerized to form a liquid crystal polymer, which can also be used in the chiral smectic phase.

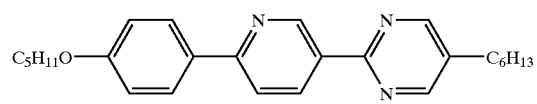

(1)

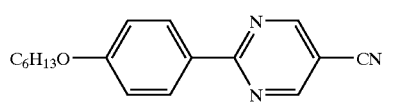

(2)

-continued
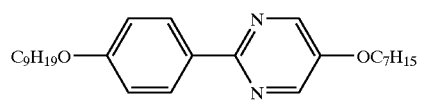
(3)
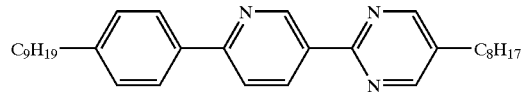
(4)
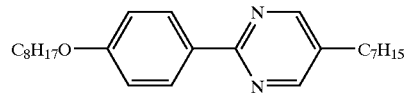
(5)
(6)
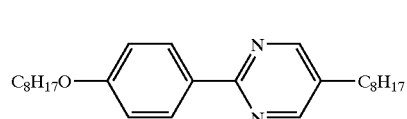
(7)
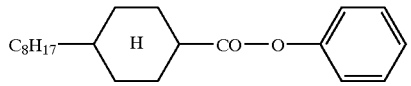
(8)
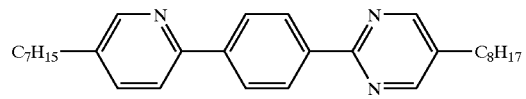
(9)
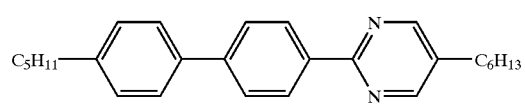
(10)
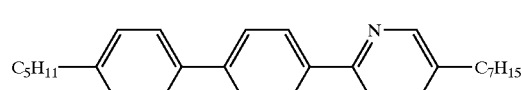
(11)
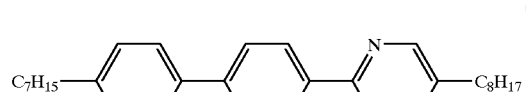
(12)
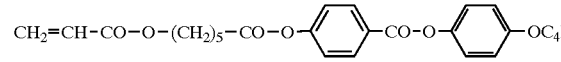
(13)
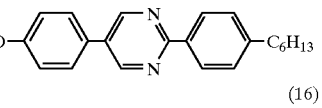
(14)
-continued
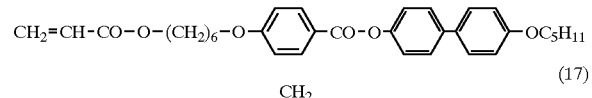
(15)
(16)
(17)
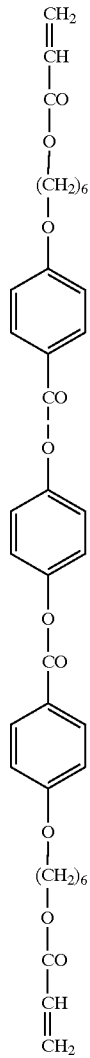
(18)
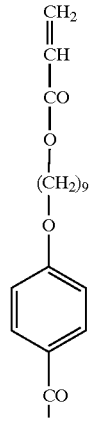

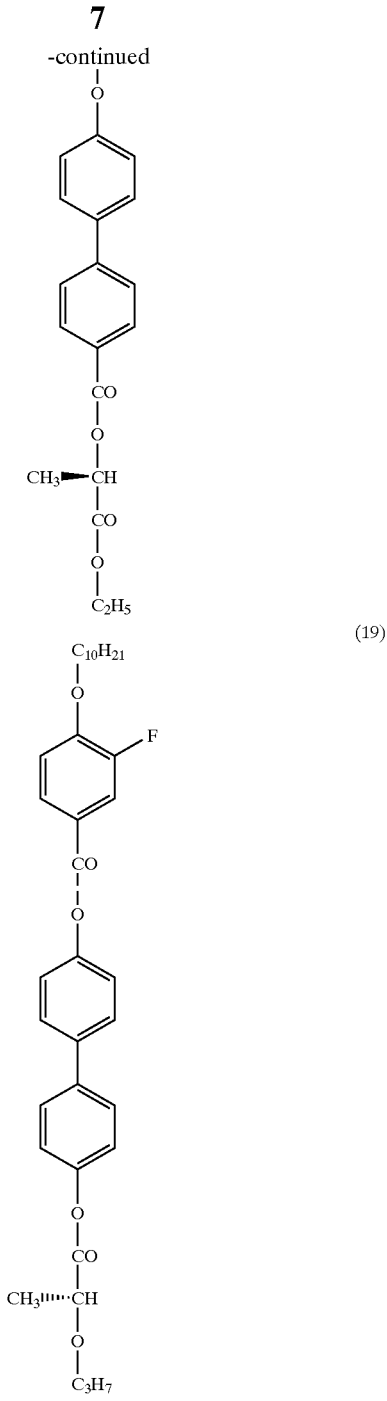

(19)

Two or more liquid crystal compounds can be used in combination. A commercially available liquid crystal compound (e.g., FLC-10854, Rolic) can be used in the chiral smectic phase.

A chiral liquid crystal compound itself can be used in the chiral smectic phase. However, a combination of a liquid crystal compound and a chiral agent is preferred to the chiral liquid crystal compound, since optical characters (particularly, helical pitch) of the chiral smectic phase can be adjusted by the ratio of the chiral agent to the liquid crystal compound.

The chiral agent generally is an optically active compound, and preferably is a low-molecular weight organic compound having an asymmetric carbon. A commercially available chiral agent, particularly a chiral agent for ferroelectric liquid crystal can be used in the chiral smectic phase.

In the chiral smectic phase, the product (Pn) of the helical pitch (P) and the average refractive index (n) is in the range of 213 to 450 nm. The average refractive index (n) depends on the liquid crystal compound. The helical pitch (P) can be controlled by the mixing ratio between the liquid crystal compound and the chiral agent. The product (Pn) is controlled to adjust the reflection spectrum in the visible wavelength region. The product (Pn) is preferably in the range of 230 to 400 nm, and more preferably in the range of 250 to 380 nm.

The axis of helix in the chiral smectic phase is preferably oriented at an angle of less than 45° to the normal of the film plane. The angle more preferably is less than 30°, further preferably is less than 20°, furthermore preferably is less than 15°, and most preferably is less than 10°.

The axis of helix in the chiral smectic phase is preferably oriented at an angle (inclined angle) of 5 to 60° to the major axis of the liquid crystal molecule. The inclined angle more preferably is in the range of 10 to 55°, and most preferably is in the range of 20 to 50°.

In a cholesteric phase, the axis of helix is essentially oriented at the angle (inclined angle) of 90° to the major axis of the liquid crystal molecule.

As described above, the wavelength range selected by the film depends on the incident angle of the light. The dependency is due to the inclined angle of less than 90° in the chiral smectic phase.

Other optical characters of the film depend on the full pitch band of chiral smectic phase.

The full pitch band is described below by referring to FIG. 1.

FIG. 1 schematically illustrates the full pitch band (F) and the half pitch band (H) in a chiral smectic phase (Sc*) and in a cholesteric phase (Ch).

In the helical alignment of cholesteric phase (Ch), the same configuration appears twice while the liquid crystal molecules are helically aligned in a full pitch (in other words, while they are once wound in 360°). However, in the chiral smectic C phase (Sc*), the same configuration appears only once while the molecules are helically aligned in a full pitch.

The conventional film comprises liquid crystal molecules in the cholesteric phase (Ch), and hence uses the half pitch band (H) of the phase. In contrast, the film of the invention comprises liquid crystal molecules in the chiral smectic C phase (Sc*), and hence uses the full pitch band (F) of the phase. This difference makes them different wavelength-selective reflection films in reflection characters.

[Substrate and Orientation Layer]

A substrate is preferably used to prepare a wavelength-selective reflection film. The wavelength-selective reflection film can be formed on a substrate or between two substrates. The formed film can be removed from the substrate. The film can also be used with the substrate.

The substrate preferably is a glass plate or a polymer film, and more preferably is a polymer film.

Examples of the polymer for the substrate include polyolefin (e.g., polyethylene, polypropylene, poly-4-methyl-pentene-1), polyolefin derivatives (e.g., polyacrylic acid, polymethacrylic acid, polyvinyl alcohol), polyamide, polyimide, polyether (e.g., polyphenylene oxide, polyacetal, epoxy resin), polyketone, polysulfone (e.g., polyphenylene sulfone), polyester (e.g., polyethylene terephthalate, polybutylene terephthalate, polyethylene naphthalate, polycarbonate), cellulose ester (e.g., cellulose triacetate), phenol resin and composite polymers thereof (e.g., polyamide-imide, polyether-imide, polyether-ether-ketone, polyether-ketone, polyketone-sulfone, polyether-sulfone). Further, the substrate film may be formed from liquid crystal polymers.

The polymer film of the substrate may be subjected to a rubbing treatment for giving an orientation function. It is also possible to provide an orientation layer on the substrate. The wavelength-selective film can be formed on the substrate (or orientation layer) without the orientation function.

The orientation layer is normally made of polyimide, polyamide, polyvinyl alcohol or silicone. The layer may be prepared from a commercially available coating liquid for orientation layer, and may be a vertical orientation layer for ferroelectric liquid crystal (e.g., LQ-1800, Hitachi-Du Pont Microsystems Co., Ltd.). The orientation layer may be subjected to the rubbing treatment.

Layers other than the orientation layer may be provided on the substrate. Those layers contain a silane-coupling agent, a metal (e.g., chromium) complex, lecithin and CTA (cetyltrimethylammonium bromide).

[Preparation of Wavelength-Selective Reflection Film]

The wavelength-selective reflection film can be prepared through the steps of: dissolving, dispersing or emulsifying the liquid crystal compound and other components (e.g., chiral agent, surface active agent) in a solvent to prepare a coating liquid; and applying and drying the coating liquid on a substrate. The coating liquid may be injected into a gap between a pair of substrates.

Examples of the solvents include hydrocarbon halides (e.g., chloroform, dichloromethane, carbon tetrachloride, dichloroethane, tetrachloroethane, trichloroethylene, tetrachloroethylene, chlorobenzene, o-dichlorobenzene), phenol, phenol halides (e.g., p-chlorophenol), aromatic hydrocarbons (e.g., benzene, toluene, xylene), ethers (e.g., methoxybenzene, 1,2-dimethoxybenzene, ethylene glycol monomethyl ether, diethylene glycol dimethyl ether, ethyl cellosolve, butyl cellosolve, tetrahydrofuran), alcohols (e.g., isopropyl alcohol, tert-butyl alcohol, glycerol, ethylene glycol, triethylene glycol), ketones (e.g., acetone, methyl ethyl ketone, methyl isobutyl ketone, cyclohexanone), esters (e.g., ethyl acetate), nitrogen-containing heterocyclic compounds (e.g., 2-pyrrolidone, N-methyl-2-pyrrolidone, pyridine), amines (e.g., triethyl amine), amides (e.g., dimethylformamide, dimethylacetamide), sulfoxides (e.g., dimethyl sulfoxide), nitriles (acetonitrile, butyronitrile) and carbon disulfide. Two or more solvents can be used in combination.

A coating solution of the layer contains the liquid crystal compound preferably in an amount of preferably 3 to 50 wt. %, and more preferably in an amount of 5 to 30 wt. %.

Examples of the coating methods include a spin coating method, a roll coating method, a printing method, a dip coating method, a curtain coating method, a wire bar coating method, a doctor blade coating method, a knife coating method, a die coating method, a gravure coating method, a micro gravure coating method, an offset gravure coating method, a RIP coating method, a spray coating method and an extrusion coating method. Two or more layers can be simultaneously formed according to a simultaneous coating method, which is described in U.S. Pat. Nos. 2,761,791, 2,941,898, 3,508,947, 3,526,528, and "Coating Technology (Japanese)", by Y. Harashima, Asakura Publishing Co., Ltd. (1973).

The coating solution of the layer can be injected into a gap between a pair of substrates in the manner generally adopted for producing a liquid crystal cell.

The wavelength-selective reflection film has a thickness preferably in the range of 0.1 to 50 $\mu$m, more preferably in the range of 0.2 to 25 $\mu$m, and most preferably in the range of 0.3 to 15 $\mu$m.

[Formation of Chiral Smectic Phase]

The coated or injected liquid crystal molecules often form a chiral smectic phase by merely controlling the temperature in preparation of the wavelength-selective reflection film. The coated or injected liquid crystal molecules can be subjected to the orientation treatment to form the chiral smectic phase in a short time.

For example, the coated or injected liquid crystal molecules are heated to form a phase that appears at a higher temperature than the chiral smectic phase, and then cooled to the temperature at which the chiral smectic phase appears. Examples of the phase that appears at a higher temperature than the chiral smectic phase include a smectic A phase (SmA, Sa), a chiral nematic phase (Ch or N*) and an isotropic phase (Iso).

A second substrate can be placed on the coated liquid crystal molecules to heat the coated molecule. For example, the liquid crystal layer between the two substrates can pass through between a pair of heating rollers. The layer between the substrates can also passes through a furnace. When the liquid crystal molecules are injected between a pair of substrates, they can be heated in the same manner without putting another substrate.

The chiral smectic phase can be formed by treatments other than heating. For example, the liquid crystal layer can be treated with an electric or magnetic field, subjected to shear stress or fluidity, stretched, or treated with temperature gradient.

[Fixation of Chiral Smectic Phase]

The formed chiral smectic phase is preferably fixed to use. The aligned molecules can be cooled to fix the phase in a glass state, or polymerized to fix the phase.

A process of cooling to fix the phase in a glass state is effective for liquid crystal molecules that form the chiral smectic phase at a temperature higher than the glass transition temperature and that are in a glass state when cooled. The liquid crystal having those characters is generally a composition mainly comprising a liquid crystal polymer. The liquid crystal molecules may be let to cool off or forced to cool (with air or water).

The liquid crystal molecules having polymerizable groups can be polymerized to fix the phase. The polymerizable groups can be introduced into components other than the liquid crystal molecules (e.g., monomers, polymer binder), and then polymerized (or cross-linked) to fix the liquid crystal molecules. Further, the polymerizable groups may be introduced into both liquid crystal molecules and other components. Examples of the polymerizable groups introduced into other components are the same as those described above for the liquid crystal molecules.

The polymerization reaction is determined according to the polymerizable group. The polymerization reaction preferably is a photo-polymerization with visible or ultraviolet rays or a polymerization with electron beams.

[Broadband Wavelength-Selective Reflection Film]

Two or more wavelength-selective reflection films having different helical pitches are laminated to prepare a broadband wavelength-selective reflection film having the collimation function.

The wavelength ranges selected by the laminated films preferably have centers different from each other by 50 nm or more. It is preferred to laminate two to six reflection films. Liquid crystal polymers are preferably used to laminate two or more reflection films.

The broadband reflection film having the collimation function can be also prepared by varying the helical pitch continuously along the thickness. For example, the concentration of chiral agent is so gradually changed along the thickness that the helical pitch may vary continuously.

The process for producing a conventional wavelength-selective reflection film, which comprises liquid crystal molecules in a cholesteric phase (described in Japanese Patent Provisional Publication Nos. 9(1997)-304770, 10(1998)-54909, 11(1999)-44816, International Patent Nos. WO97/16762 and WO00/34808), can be applied to production of the reflection film of the invention, which comprises liquid crystal molecules in a chiral smectic phase. From the thus-produced films, the broadband reflection film can be prepared.

The broadband wavelength-selective reflection film can be used as a collimator of liquid crystal display. That display comprises a backlight, the broadband reflection film (collimator), a linearly polarized film, and a liquid crystal cell in this order.

The wavelength range in which light the film can reflect as circularly polarized light is preferably designed to be as close as possible to that of light emitted from the backlight. The difference between them is preferably 20 nm or less.

When installed in a liquid crystal display, the reflection film may be laminated on a viewing angle-compensatory sheet (described in Japanese Patent Provisional Publication No. 2(1990)-160204 and Japanese Patent No. 2,587,298).

EXAMPLE 1

(Preparation of Liquid Crystal Composition)

Equal masses of the liquid crystal compounds (11), (12) and (13) were mixed to prepare a liquid crystal composition 1. The phase transition temperatures of the composition 1 were measured from a high temperature to a low temperature. The results are shown below.

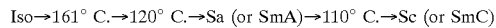

Iso→161° C.→120° C.→Sa (or SmA)→110° C.→Sc (or SmC)

Independently, the liquid crystal compound (5), (6), (7) and (8) were mixed to prepare a liquid crystal composition 2, in which the amount of the compound (5) was 20 wt. %, the amount of the compound (6) was 20 wt. %, the amount of the compound (7) was 20 wt. %, and the amount of the compound (8) was 40 wt. %. The phase transition temperatures of the composition 2 were measured from a high temperature to a low temperature. The results are shown below.

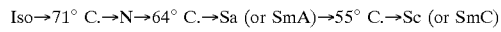

Iso→71° C.→N→64° C.→Sa (or SmA)→55° C.→Sc (or SmC)

Equal masses of the liquid crystal compositions 1 and 2 were mixed to prepare a liquid crystal composition 3. The phase transition temperatures of the composition 3 were measured from a high temperature to a low temperature. The results are shown below.

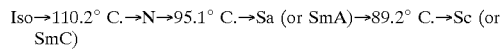

Iso→110.2° C.→N→95.1° C.→Sa (or SmA)→89.2° C.→Sc (or SmC)

The Δn of the composition 3 was 0.20.

A commercially available ferroelectric liquid crystal composition (FLC-10854, Rolic) and the composition 3 were mixed (mixing ratio: 67:33 by weight) to prepare a liquid crystal composition 4. The phase transition of the composition 4 was observed from a high temperature to a low temperature, and found as the order of Iso→Ch (or N*)→Sa (or SmA)→Sc* (or SmC*).

A glass plate having an ITO electrode was subjected to the horizontal orientation treatment. This procedure was repeated to prepare two substrates, which were then arranged face-to-face so that the gap might be 5 μm. To the gap, the composition 4 was injected. While direct current of ±50 V was applied at room temperature, the angle between the axis of helix and the major axis of liquid crystal molecule was measured and found 25°.

(Preparation of Wavelength-Selective Reflection Film)

A glass substrate (thickness: 0.5 mm) was spin-coated with a commercially available coating liquid for vertical orientation layer (LQ-1800, Hitachi-Du Pont Micro-systems Co., Ltd.), and heated at 250° C. for 1 hour to form an orientation layer.

The procedure was repeated to prepare two substrates with orientation layers. The substrates were then arranged face-to-face so that the orientation layers might be inside, and laminated with adhesive containing spacers (diameter: 10 μm). The composition 4 was injected to the gap at 120° C., and cooled to room temperature at the rate of −0.5° C./second. Thus, a wavelength-selective reflection film was prepared.

The product (Pn) of the helical pitch (P) and the average refractive index (n) was found 300 nm.

(Evaluation of Wavelength-Selective Reflection Film)

The prepared reflection film reflected obliquely coming incident light, and gave a selected reflection color. Incident light coming perpendicularly to the film passed through the film, and the film reflected obliquely coming incident light. While the film was exposed to obliquely coming incident light, the transmission spectrum was measured.

Figure 2:
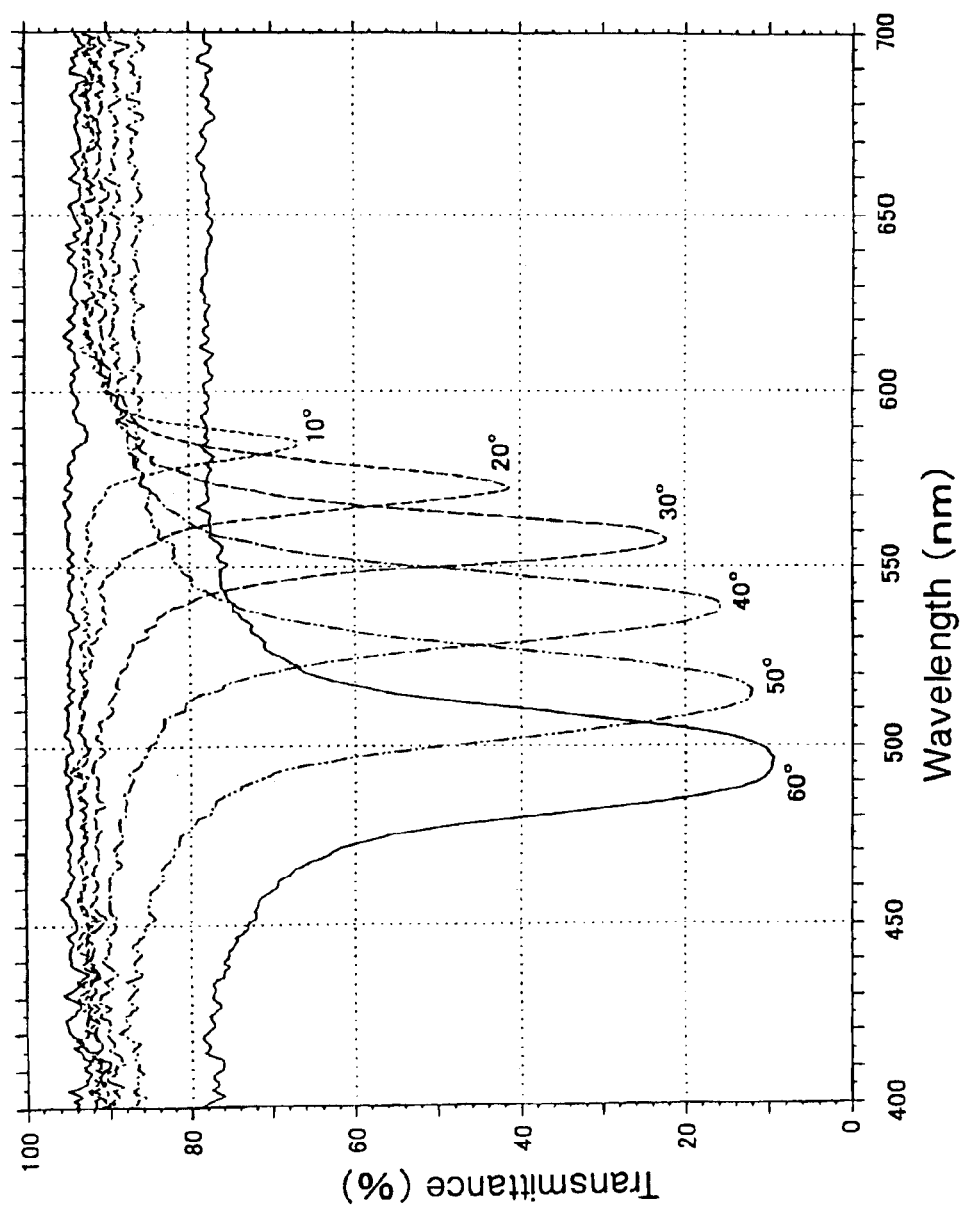
FIG. 2 shows results of a transmission spectrum of a wavelength-selective reflection film, which indicates dependence on an incident angle.

FIG. 2 shows the results indicating how the transmission spectrum of the film depends on the incident angle.

As shown in FIG. 2, the larger incident angle light came at, the shorter wavelength it was reflected at. Further, in proportion to the incident angle, the intensity of reflected light increased. These incident angle-dependent optical characters were not changed no matter how the film was inclined, and this fact indicated that the axis of helix in the film was oriented almost parallel to the normal of the film plane.

The liquid crystal molecules in the composition 4 were clockwise-helically aligned, but the prepared reflection film reflected not only clockwise but also counterclockwise circularly polarized light. The prepared film reflected clockwise and counterclockwise circularly polarized light, and converted into counterclockwise and clockwise-polarized light, respectively. On the other hand, the film reflected linearly polarized light, so that the reflected light had the plane of polarization rotating by 90° based on that of the incident light.

A linearly polarizing film was placed on the reflection film, and observed. As a result, no selected reflection was observed no matter how the linearly polarizing film was positioned or no matter what direction the films were seen in.

EXAMPLE 2

(Preparation of Liquid Crystal Composition)

The commercially available ferroelectric liquid crystal composition (FLC-10854, Rolic) and the composition 3 prepared in Example 1 were mixed (mixing ratio: 73:27 by weight) to prepare a liquid crystal composition 5. The phase transition of the composition 5 was observed from a high temperature to a low temperature, and found as the order of Iso→Ch (or N*)→Sa (or SmA)→Sc* (or SmC*).

(Preparation and Evaluation of Wavelength-Selective Reflection Film)

The procedure of Example 1 was repeated except for using the composition 5 instead of the composition 4, to prepare and evaluate a wavelength-selective reflection film.

The product (Pn) of the helical pitch (P) and the average refractive index (n) was found 275 nm.

The results were similar to those in Example 1 except that the reflected light had the maximum peak at a shorter wavelength than that in Example 1.

EXAMPLE 3
(Preparation of Liquid Crystal Composition)

The commercially available ferroelectric liquid crystal composition (FLC-10854, Rolic) and the composition 3 prepared in Example 1 were mixed (mixing ratio: 70:30 by weight) to prepare a liquid crystal composition 6. The phase transition of the composition 6 was observed from a high temperature to a low temperature, and found as the order of Iso→Ch (or N*)→Sa (or SmA)→Sc* (or SmC*).
(Preparation and Evaluation of Wavelength-Selective Reflection Film)

The procedure of Example 1 was repeated except for using the composition 6 instead of the composition 4, to prepare and evaluate a wavelength-selective reflection film.

The product (Pn) of the helical pitch (P) and the average refractive index (n) was found 287 nm.

The results were similar to those in Example 1 except that the reflected light had the maximum peak at a wavelength between those in Examples 1 and 2.

EXAMPLE 4
(Preparation of Liquid Crystal Composition)

The commercially available ferroelectric liquid crystal composition (FLC-10854, Rolic) and the composition 3 prepared in Example 1 were mixed (mixing ratio: 64:36 by weight) to prepare a liquid crystal composition 7. The phase transition of the composition 7 was observed from a high temperature to a low temperature, and found as the order of Iso→Ch (or N*)→Sa (or SmA)→Sc* (or SmC*).
(Preparation and Evaluation of Wavelength-Selective Reflection Film)

The procedure of Example 1 was repeated except for using the composition 7 instead of the composition 4, to prepare and evaluate a wavelength-selective reflection film.

The product (Pn) of the helical pitch (P) and the average refractive index (n) was found 315 nm.

The results were similar to those in Example 1 except that the reflected light had the maximum peak at a longer wavelength than that in Example 1.

EXAMPLE 5
(Preparation of Liquid Crystal Composition)

The commercially available ferroelectric liquid crystal composition (FLC-10854, Rolic) and the composition 3 prepared in Example 1 were mixed (mixing ratio: 61:39 by weight) to prepare a liquid crystal composition 8. The phase transition of the composition 8 was observed from a high temperature to a low temperature, and found as the order of Iso→Ch (or N*)→Sa (or SmA)→Sc* (or SmC*).
(Preparation and Evaluation of Wavelength-Selective Reflection Film)

The procedure of Example 1 was repeated except for using the composition 8 instead of the composition 4, to prepare and evaluate a wavelength-selective reflection film.

The product (Pn) of the helical pitch (P) and the average refractive index (n) was found 330 nm.

The results were similar to those in Example 1 except that the reflected light had the maximum peak at a longer wavelength than that in Example 4.

EXAMPLE 6
(Preparation of Liquid Crystal Composition)

The commercially available ferroelectric liquid crystal composition (FLC-10854, Rolic) and the composition 3 prepared in Example 1 were mixed (mixing ratio: 58:42 by weight) to prepare a liquid crystal composition 9. The phase transition of the composition 9 was observed from a high temperature,to a low temperature, and found as the order of Iso→BCh (or N*)→Sa (or SmA)→Sc* (or SmC*).
(Preparation and Evaluation of Wavelength-Selective Reflection Film)

The procedure of Example 1 was repeated except for using the composition 9 instead of the composition 4, to prepare and evaluate a wavelength-selective reflection film.

The product (Pn) of the helical pitch (P) and the average refractive index (n) was found 348 nm.

The results were similar to those in Example 1 except that the reflected light had the maximun peak at a longer wavelength than that in Example 5.

EXAMPLE 7
(Preparation of Liquid Crystal Composition)

The commercially available ferroelectric liquid crystal composition (FLC-1054, Rolic) and the composition 3 prepared in Example 1 were mixed (mixing ratio: 55:45 by weight) to prepare a liquid crystal composition 10. The phase transition of the composition 10 was observed from a high temperature to a low temperature, and found as the order of Iso→Ch (or N*)→Sa (or SmA)→Sc* (or SmC*).
(Preparation and Evaluation of Wavelength-Selective Reflection Film)

The procedure of Example 1 was repeated except for using the composition 10 instead of the composition 4, to prepare and evaluate a wavelength-selective reflection film.

The product (Pn) of the helical pitch (P) and the average refractive index (n) was found 365 nm.

The results were similar to those in Example 1 except that the reflected light had the maximum peak at a longer wavelength than that in Example 6.

EXAMPLE 8
(Preparation and Evaluation of Optical Collimator)

The wavelength-selective reflection films prepared in Examples 1 to 7 were laminated with optical oil. The order of the films was 2/3/1/4/5/6/7 in terms of the number of Example. Thus, a broadband wavelength-selective reflection film was prepared.

The thus-prepared broadband reflection film was placed on a diffusing plate provided on a light-guide plate of LCD backlight, to prepare an optical collimator of photo-recycle type.

The prepared collimator was installed in a liquid crystal display, and observed. As a result, the display gave the brightest image when seen frontally. However, the more obliquely the display was seen, the more the brightness of the image decreased steeply.

I claim:

1. A wavelength-selective reflection film comprising at least one layer in which liquid crystal molecules are aligned in a chiral smectic phase having a helical pitch and an average refractive index, wherein the product of the helical pitch and the average refractive index is in the range of 213 to 450 nm, and wherein the layer selectively reflects light in a particular wavelength range, and selectively transmits light in another wavelength range, and wherein the chiral smectic phase has an axis of helix that is oriented at an angle of 5 to 60° to a major axis of the liquid crystal molecules.

2. The wavelength-selective reflection film of claim 1, wherein the product of the helical pitch and the average refractive index is in the range of 230 to 400 nm.

3. The wavelength-selective reflection film of claim 2, wherein the product of the helical pitch and the average refractive index is in the range of 250 to 380 nm.

4. The wavelength-selective reflection film of claim 1, wherein the chiral smectic phase has an axis of helix that is oriented at an angle of less than 45° to a normal of the film plane.

5. The wavelength-selective reflection film of claim 4, wherein the chiral smectic phase has an axis of helix that is oriented at an angle of less than 20° to a normal of the film plane.

6. The wavelength-selective reflection film of claim 5, wherein the chiral smectic phase has an axis of helix that is oriented at an angle of less than 10° to a normal of the film plane.

7. The wavelength-selective reflection film of claim 1, wherein the chiral smectic phase has an axis of helix that is oriented at an angle of 10 to 55° to a major axis of the liquid crystal molecules.

8. The wavelength-selective reflection film of claim 7, wherein the chiral smectic phase has an axis of helix that is oriented at an angle of 20 to 50° to a major axis of the liquid crystal molecules.

9. The wavelength-selective reflection film of claim 1, wherein the liquid crystal molecules are rod-like liquid crystal molecules.

10. The wavelength-selective reflection film of claim 1, wherein each of the liquid crystal molecules has a polymerizable group as a substituent group bound to an end of the rod-like liquid crystal molecule.

11. The wavelength-selective reflection film of claim 1, wherein the liquid crystal molecules are polymerized to fix the chiral smectic phase.

12. The wavelength-selective reflection film of claim 1, wherein the chiral smectic phase is a chiral smectic C phase.

13. A wavelength-selective reflection film comprising at least one layer in which liquid crystal molecules are aligned in a chiral smectic phase having a helical pitch and an average refractive index, wherein the product of the helical pitch and the average refractive index is in the range of 213 to 450 nm, and wherein the layer selectively reflects light in a particular wavelength range, and selectively transmits light in another wavelength range, and wherein the helical pitch continuously changes along the direction of the thickness of the layer.

14. A broadband wavelength-selective reflection film, which comprises two or more wavelength-selective reflection films, each of said films comprising at least one layer in which liquid crystal molecules are aligned in a chiral smectic phase having a helical pitch and an average refractive index, wherein the product of the helical pitch and the average refractive index is in the range of 213 to 450 nm, and wherein the layer selectively reflects light in a particular wavelength range, and selectively transmits light in another wavelength range, and wherein the films are different in the helical pitch.

15. An optical collimator comprising a broadband wavelength-selective reflection film, which comprises two or more wavelength-selective reflection films, each of said films comprising at least one layer in which liquid crystal molecules are aligned in a chiral smectic phase having a helical pitch and an average refractive index, wherein the product of the helical pitch and the average refractive index is in the range of 213 to 450 nm, and wherein the layer selectively reflects light in a particular wavelength range, and selectively transmits light in another wavelength range, and wherein the films are different in the helical pitch.

16. A liquid crystal display comprising a backlight, a wavelength-selective reflection film, a linearly polarizing film and a liquid crystal cell in this order, said film comprising at least one layer in which liquid crystal molecules are aligned in a chiral smectic phase having a helical pitch and an average refractive index, wherein the product of the helical pitch and the average refractive index is in the range of 213 to 450 nm, and wherein the layer selectively reflects light in a particular wavelength range, and selectively transmits light in another wavelength range.

17. A liquid crystal display comprising a backlight, a broadband wavelength-selective reflection film, a linearly polarizing film and a liquid crystal cell in this order, wherein the broadband wavelength-selective reflection film comprises two or more wavelength-selective reflection films, each of said films comprising at least one layer in which liquid crystal molecules are aligned in a chiral smectic phase having a helical pitch and an average refractive index, wherein the product of the helical pitch and the average refractive index is in the range of 213 to 450 nm, wherein the layer selectively reflects light in a particular wavelength range, and selectively transmits light in another wavelength range, and wherein the films are different in the helical pitch.

* * * * *